Patented Dec. 8, 1942

2,304,563

UNITED STATES PATENT OFFICE 2,304,563

PROCESS FOR THE PRODUCTION OF RACEMIC MENTHOL

George Henry Gerlach, Jackson Heights, N. Y., and Robert S. Shelton, Mariemont, Ohio, assignors to Vick Chemical Company, New York, N. Y., a corporation of Delaware No Drawing. Application March 28, 1942, Serial No. 436,610

2 Claims. (Cl. 260—631)

This invention relates to the production of menthol.

Various methods have been proposed for the production of menthol from thymol and from other materials, but such processes have heretofore not been particularly successful because of the poor yield of menthol obtained, relatively large quantities of other materials, such as isomenthols, being produced.

In accordance with the present invention, racemic menthol is obtained by the reaction of 1-methylcyclohexan-3-one with an alkali metal, e. g., sodium isopropylate. The reaction is advantageously carried out under pressure, for example in a sealed autoclave. The reaction is an oxidation-reduction process, and yields racemic menthol in reasonable yields.

The invention will be further illustrated by the following example, but it is not limited thereto.

Example 20 parts of sodium are dissolved in 318 parts of boiling anhydrous isopropyl alcohol. To the resulting solution is added 95 parts of 1-methylcyclohexan-3-one, and the mixture is heated in an autoclave at 220–225° C. for about 16 hours. The reaction mixture is then diluted with 2500 parts of water, extracted with ether, the ether solution washed with water and then dried with a calcium sulfate desiccant. The ether is then removed by evaporation and the residue fractionally distilled. The fraction boiling at 85–100° C./8 mm. contains racemic menthol, which may be purified by refractionation.

We claim:

1. A process for the production of racemic menthol which comprises reacting 1-methylcyclohexan-3-one with an alkali metal isopropylate.

2. A process for the production of racemic menthol which comprises reacting 1-methylcyclohexan-3-one with sodium isopropylate.

GEORGE HENRY GERLACH.
ROBERT S. SHELTON.